(12) United States Patent
Oono

(10) Patent No.: US 6,844,914 B2
(45) Date of Patent: Jan. 18, 2005

(54) IMAGE RECORDING DEVICE

(75) Inventor: Takehisa Oono, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/351,412

(22) Filed: Jan. 27, 2003

(65) Prior Publication Data
US 2003/0142279 A1 Jul. 31, 2003

(30) Foreign Application Priority Data
Jan. 28, 2002 (JP) .................................... 2002-017913

(51) Int. Cl.[7] .............................................. G03B 27/52
(52) U.S. Cl. ........................................ 355/40; 355/27
(58) Field of Search ............................. 355/27, 38, 40, 355/67

(56) References Cited

U.S. PATENT DOCUMENTS 4,959,683 A * 9/1990 Otake et al. .................. 355/28
5,721,610 A * 2/1998 Kiten et al. ................... 355/75
5,861,942 A * 1/1999 Ohsone et al. ................ 355/27
6,364,546 B1 * 4/2002 Oka et al. .................... 396/599
6,538,718 B2 * 3/2003 Ando et al. ................... 355/50
2001/0004288 A1 * 6/2001 Tsuji ........................... 358/301

FOREIGN PATENT DOCUMENTS

JP          4-105970          7/1992

* cited by examiner

Primary Examiner—Rodney Fuller
(74) Attorney, Agent, or Firm—Sughrue Mion, PLLC

(57) ABSTRACT

An image recording device has a supporting surface which supports a photographic printing paper at an exposure position, and a conveying roller pair in a vicinity of the supporting surface. A projecting height of a nip position of the conveying roller pair from the supporting surface is 5 μm to 300 μm. Further, a step between the supporting surface at the exposure position and a conveying guide adjacent to the supporting surface is 1.0 mm or less. The shock or vibrations, which are generated at the leading end or the trailing end of the photographic printing paper are reduced. Moreover, the conveying roller pair and a pressing roller block propagation of vibrations to the exposure region.

18 Claims, 12 Drawing Sheets

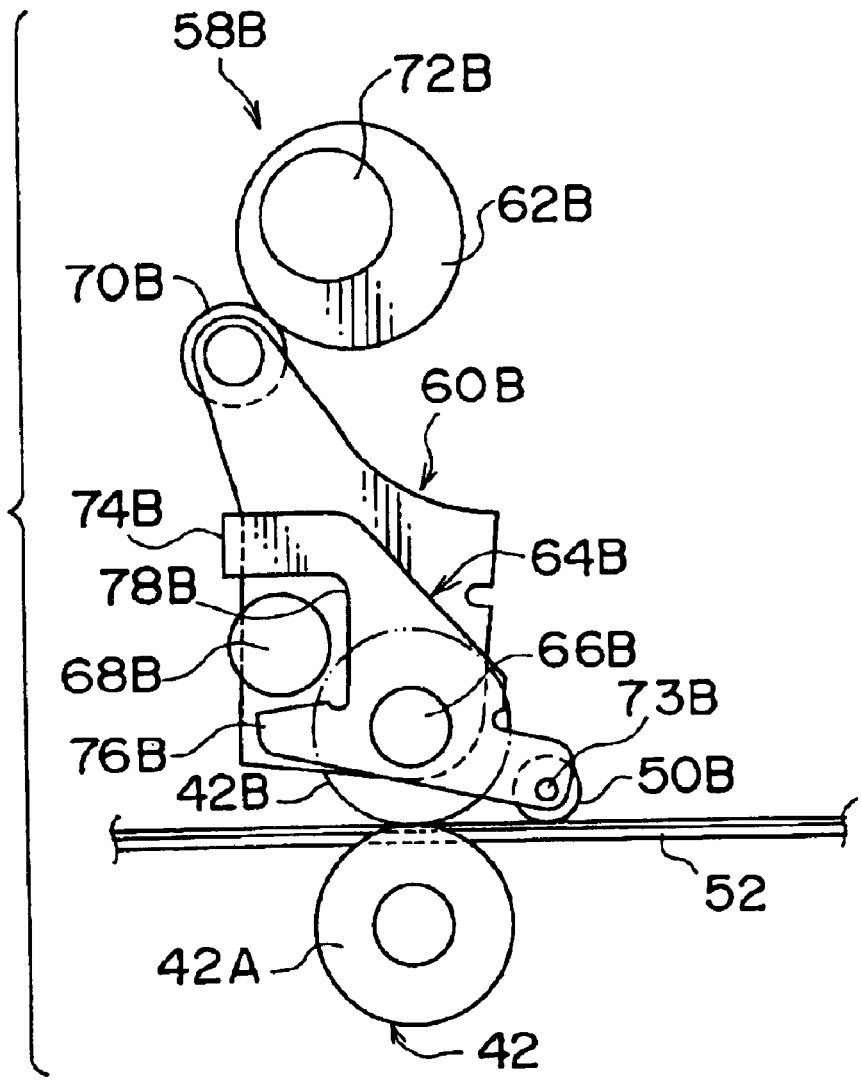

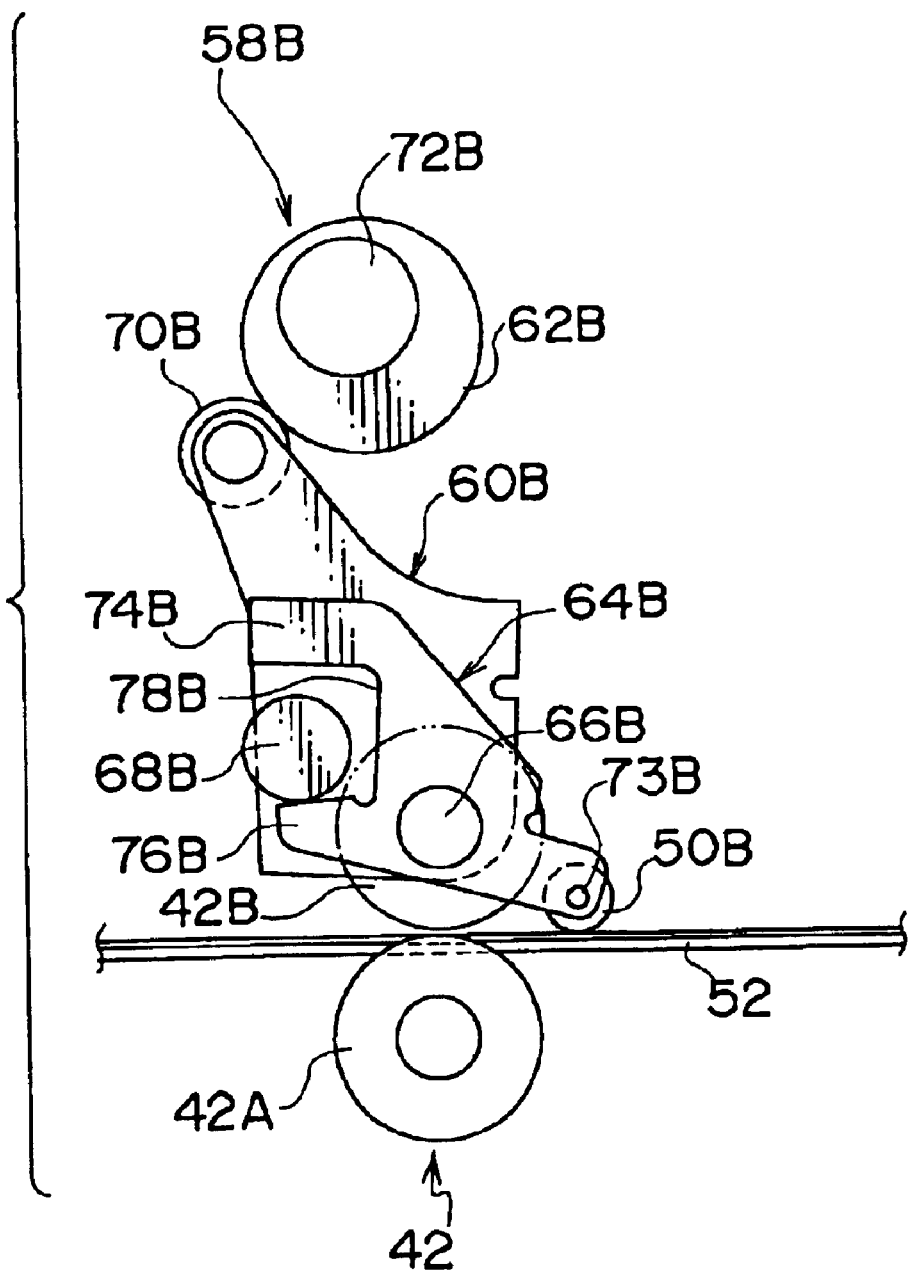

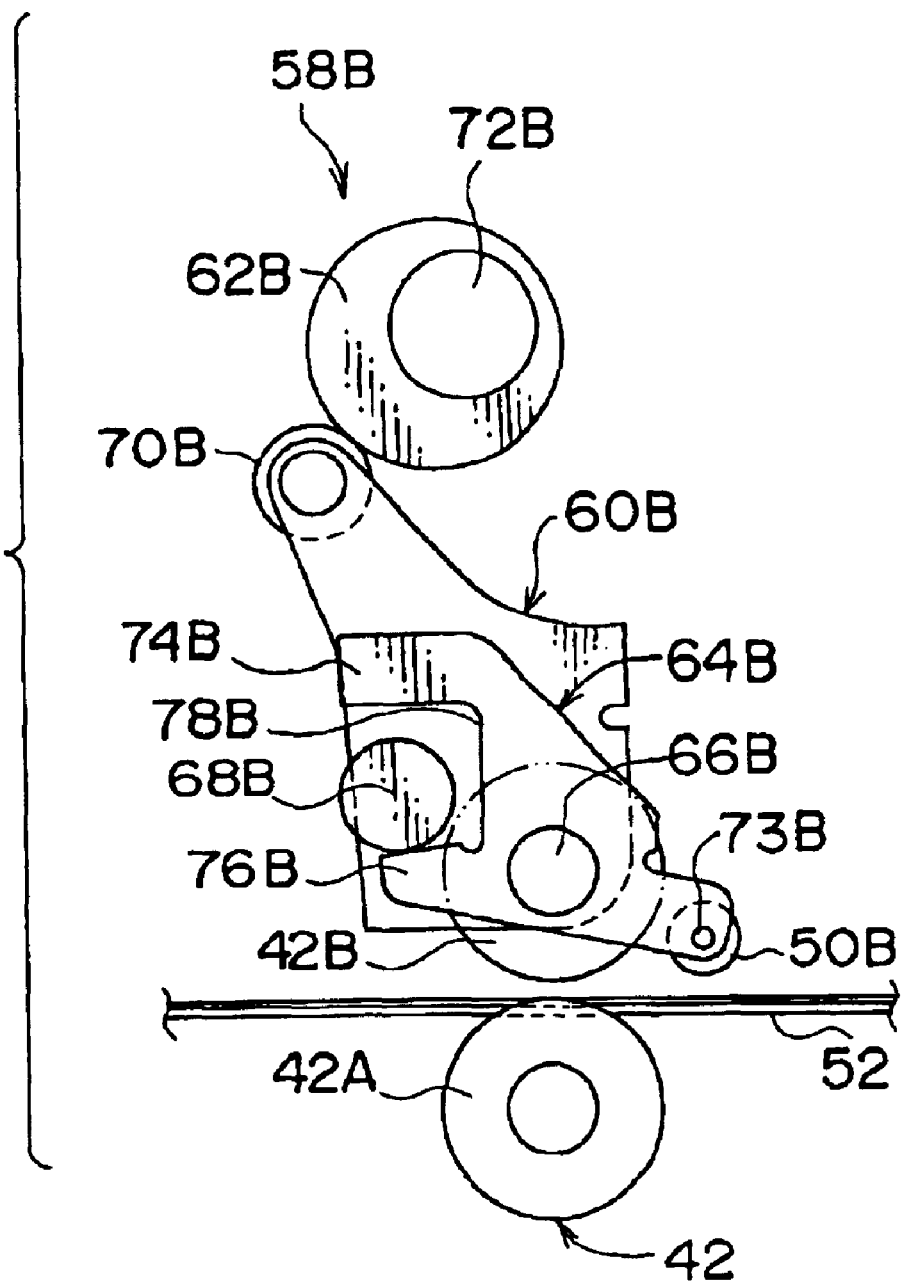

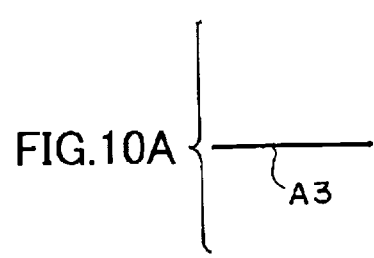
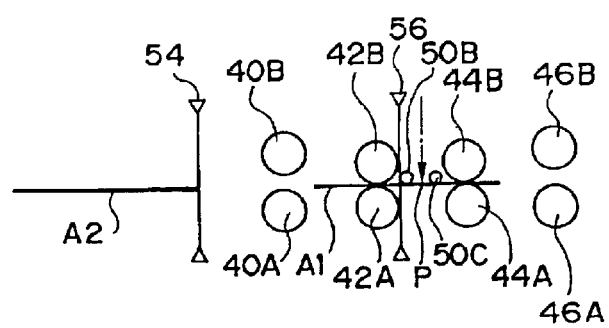
FIG.10A
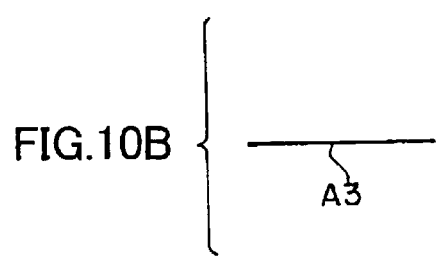
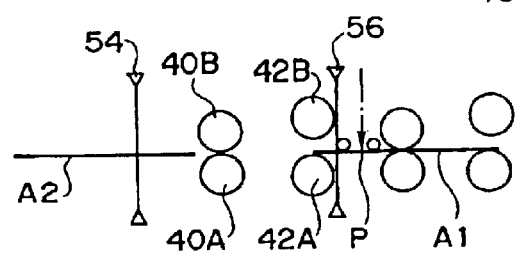
FIG.10B
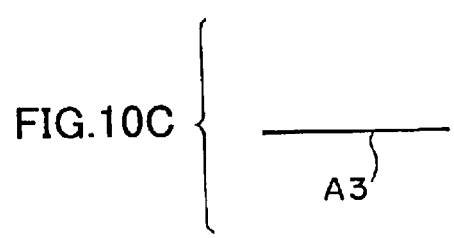
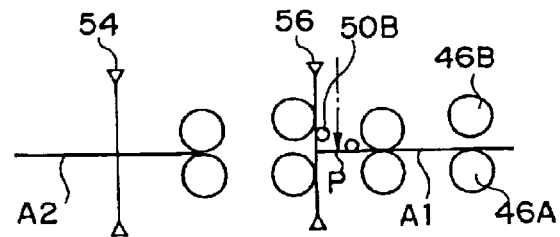
FIG.10C

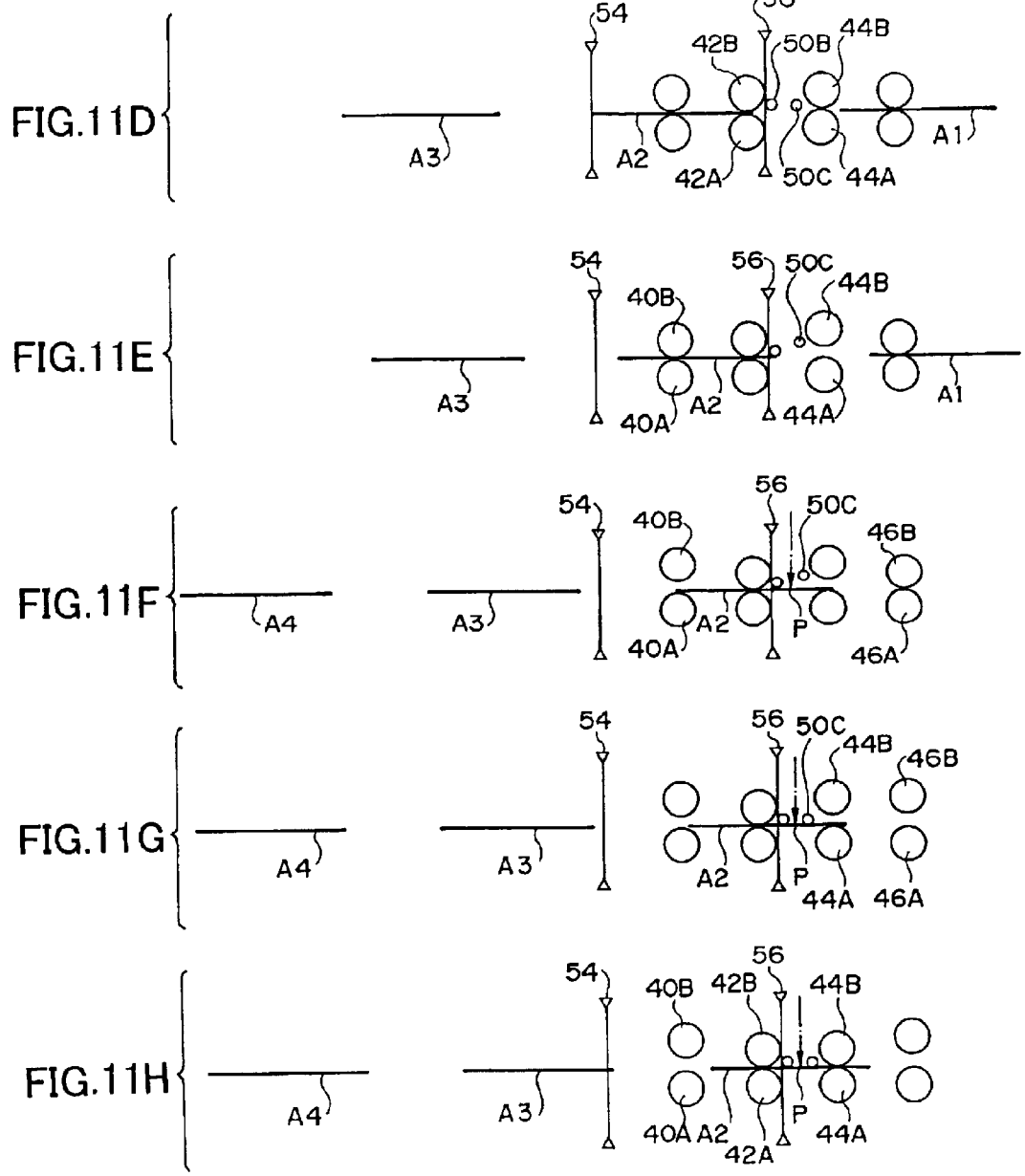

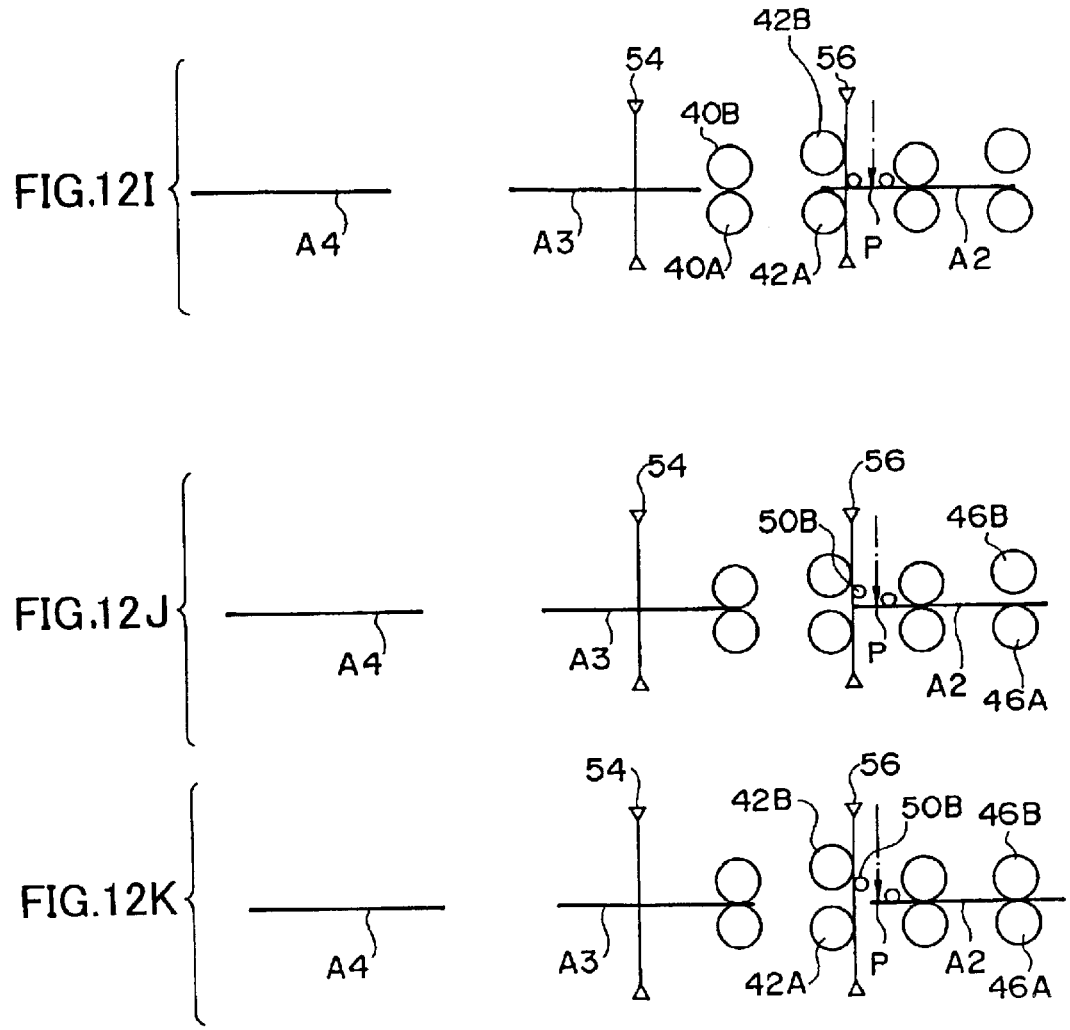

IMAGE RECORDING DEVICE

BACKGROUND OF THE INVENTION

1. Field of the Invention

The present invention relates to an image recording device which exposes a photosensitive material and forms an image thereon.

2. Description of the Related Art

In recent years, printing devices using digital exposure, i.e., digital photoprinters, carrying out the following operations have come to be put into practice. A digital photoprinter photoelectrically reads an image recorded on a film, converts the read image into a digital signal, and thereafter, carries out various image processings so as to prepare image data for recording. The digital photoprinter scan-exposes a photosensitive material by recording light which has been modulated in accordance with the image data, so as to record an image (latent image) on the photosensitive material. The digital photoprinter then subjects the photosensitive material to developing processing and outputs the image as a print (photograph).

Such a digital photoprinter is basically structured by an input device having a scanner (image reading device) and an image processing device; and an output device having a printing device (image recording device) and a developing device. At the scanner, projected light of an image photographed on a film is photoelectrically converted by an image sensor such as a CCD sensor or the like, and is read (is read photoelectrically), and is sent to the image processing device as image data (an image data signal) of the film. The image processing device carries out predetermined image processings on the image data, and sends the processed image data to the printing device as output image data (exposure conditions) for image recording. If the printing device is, for example, a device utilizing light beam scan-exposure, the printing device deflects, in a main scanning direction, a light beam which has been modulated in accordance with the supplied image data, and conveys a photographic printing paper in a subscanning direction which is orthogonal to the main scanning direction. The printing device thereby forms a latent image on the photographic printing paper. The printing device also, as needed, records certain items on the reverse surface of the photographic printing paper (backprinting). In the developing device, a predetermined developing processing and the like are carried out on the exposed photographic printing paper, so as to form a print in which the image which was photographed on the film is reproduced.

In this case, in the printing device, the photographic printing paper is guided to an exposure position by conveying roller pairs and conveying guides. Image recording is carried out with the flatness of the photographic printing paper being ensured by the photographic printing paper being nipped by conveying roller pairs at two points (two places) in a vicinity of the exposure position, one point being at one side of the exposure position and the other point being at the other side of the exposure position.

However, for various reasons, vibrations arise at the photographic printing paper which is being conveyed, and these vibrations propagate to the exposure region of the photographic printing paper. There is therefore the concern that nonuniform exposure will arise. For example, due to the leading end or the trailing end of the photographic printing paper passing over a step portion between a flattening guide supporting the photographic printing paper at the exposure section (exposure position) and a conveying guide upstream of the exposure section (exposure position), or due to the photographic printing paper riding up over conveying rollers projecting from the flattening guide, vibrations are propagated to the exposure region of the photographic printing paper, variations in load arise at the conveying rollers, and non-uniform exposure occurs.

Further, when vibrations arise at the photographic printing paper at a region thereof which is away from the exposure position, although the pair of roller pairs disposed at either side of the exposure position are nipping the photographic printing paper, the photographic printing paper is nipped at only one point (one place) between the exposure position and the position at which the vibrations are being generated. Thus, with the nipped position serving as a fulcrum, the vibrations propagate to the exposure region of the photographic printing paper, and it is not possible to completely suppress non-uniform exposure.

SUMMARY OF THE INVENTION

In order to overcome such drawbacks, an object of the present invention is to provide an image recording device in which vibrations of a photosensitive material at an exposure position can be suppressed such that good image recording can be carried out.

A first aspect of the present invention is an image recording device having an exposure position, for exposing a photosensitive material at the exposure position to record an image on the photosensitive material, said image recording device comprising: a fixed guide having a supporting surface which supports the photosensitive material at the exposure position; and a pair of conveying rollers disposed near the exposure position, nipping the photosensitive material therebetween, and conveying the photosensitive material in a predetermined direction, wherein a nip formed by the pair of conveying rollers is positioned so as to project 5 $\mu$m to 300 $\mu$m from the supporting surface.

In the first aspect of the present invention, at the exposure position, the position of the nip of the pair of conveying rollers (the conveying roller pair) is disposed at a height of 5 $\mu$m to 300 $\mu$m from the supporting surface of the fixed guide which supports the photosensitive material at the exposure position.

The conveying rollers are formed of rubber or the like, and the outer peripheral surfaces of the rollers are deformed by the nipping. However, by setting the nip position of the pair of conveying rollers to be at least 5 $\mu$m from the supporting surface of the fixed guide, it is possible to prevent the nip position (height) from becoming lower than the supporting surface of the fixed guide, and stable conveying can be ensured.

Further, when the projecting height is great, at the time when the leading end of the photosensitive material rides up over a lower roller of the pair of conveying rollers, or at the time when the trailing end of the photosensitive material comes down off from the lower roller onto the fixed guide, vibrations are generated at the photosensitive material, and these vibrations propagate to the exposure region of the photosensitive material. There is therefore the concern that non-uniform exposure will occur. Thus, here, by setting the projecting amount to be less than or equal to 300 $\mu$m, vibrations at the time when the photosensitive material rides up over the lower roller are suppressed, and non-uniform exposure is prevented.

Namely, by setting the projecting amount to be from 5 $\mu$m to 300 $\mu$m, it is possible to prevent the nip position from becoming lower than the supporting surface of the fixed guide, and it is possible to prevent errors in conveying from occurring. At the same time, vibrating of the photosensitive material caused by the photosensitive material riding up over the lower roller forming the pair of conveying rollers is suppressed, and non-uniform exposure is prevented.

A second aspect of the present invention is an image recording device having an exposure position, for exposing a photosensitive material at the exposure position to record an image on the photosensitive material, said image recording device comprising: a fixed guide having a supporting surface which supports the photosensitive material at the exposure position; a conveying guide disposed adjacent, in a conveying-direction, to the fixed guide, and having a supporting surface which supports the photosensitive material; and a pair of conveying rollers nipping the photosensitive material therebetween, and conveying the photosensitive material in a predetermined direction, a nip formed by the pair of conveying rollers being positioned so as to project above the conveying guide, wherein the nip formed by the pair of conveying rollers is positioned so as to project 0.1 to 0.5 mm from the supporting surface of the conveying guide.

In the second aspect of the present invention, at the conveying guide which is adjacent to the fixed guide which supports the photosensitive material at the exposure position, the position at which the pair of conveying rollers, which are disposed at the conveying guide, nip the photosensitive material projects (is made higher) by 0.1 mm to 0.5 mm from the photosensitive material supporting surface of the conveying guide. By setting this projecting amount to be 0.1 mm or more, even if the rollers deform due to the nipping, it is possible to prevent the nip position of the pair of conveying rollers from becoming lower than the supporting surface of the conveying guide. Further, by setting this projecting amount to be 0.5 mm or lower, vibrating of the photosensitive material caused by the photosensitive material riding up over the lower roller of the pair of conveying rollers is suppressed, and non-uniform exposure is prevented.

In the second aspect of the invention, the image recording device may further comprise another pair of conveying rollers disposed near the exposure position between the pair of conveying rollers and the exposure position.

In this case, there is also said another pair of conveying rollers at the fixed guide which is further toward the exposure position than the conveying guide. Thus, the effect of suppressing propagation of vibrations to the exposure position of the photosensitive material by the nipping of said another pair of conveying rollers can be expected. Accordingly, as compared with the first aspect, the projecting amount can be made to be larger.

A third aspect of the present invention is an image recording device having an exposure position, for exposing a photosensitive material, which is conveyed in a predetermined direction, at the exposure position, to record an image on the photosensitive material, said image recording device comprising: a fixed guide having a supporting surface which supports the photosensitive material at the exposure position; a conveying guide disposed adjacent, in a conveying-direction, to the fixed guide, and having a supporting surface which supports the photosensitive material, wherein a step between the supporting surface of the fixed guide and the supporting surface of the conveying guide is 1.0 mm or less.

In the third aspect of the present invention, there is a step between (the photosensitive material supporting surface of) the fixed guide which supports the photosensitive material at the exposure position, and (the photosensitive material supporting surface of) the conveying guide which is disposed adjacent to the fixed guide in the conveying-direction and which supports the photosensitive material. Accordingly, when the leading end of the photosensitive material which is undergoing exposure moves from being on the fixed guide to onto the conveying guide at the conveying-direction downstream side, or when the trailing end of the photosensitive material which is undergoing exposure moves from the conveying guide at the conveying-direction upstream side onto the fixed guide, there is the concern that the leading end or the trailing end of the photosensitive material will vibrate due to this step and that non-uniform exposure of the photosensitive material will occur. Thus, here, by making the stepped amount by 1.0 mm or less, vibrations generated at the photosensitive material are suppressed, and such nonuniform exposure is reliably prevented.

In the first aspect of the present invention, the fixed guide can be formed by a single flat plate of a size which can support the entire photosensitive material which is undergoing exposure. Moreover, in the second and third aspects, the fixed guide and the conveying guide can be formed integrally, and can be formed by a single flat plate of a size which can support the entire photosensitive material which is undergoing exposure.

Because the entire photosensitive material which is undergoing exposure can be supported at the fixed guide, it is possible to prevent the photosensitive material which is undergoing exposure from being affected by the step between the fixed guide and the conveying guide which is adjacent to the fixed guide in the conveying-direction.

A fourth aspect of the present invention is an image recording device having an exposure position, for exposing a surface of a photosensitive material, which is conveyed in a predetermined direction, at the exposure position to record an image on the surface of the photosensitive material, said image recording device comprising: a plurality of pressing members which are disposed at at least one of a conveying-direction upstream side and a conveying-direction downstream side of the exposure position, are respectively disposed at different positions, press the photosensitive material undergoing exposure, and block propagation of vibration generated at the photosensitive material.

In the fourth aspect of the present invention, even if a pressing member, which presses the photosensitive material and blocks vibration, is disposed at one place at either the conveying-direction upstream side or the conveying-direction downstream side of the exposure position of the photosensitive material, it will not be possible to reliably stop the vibrations, which are generated at the trailing end or the leading end of the photosensitive material undergoing exposure, from propagating to the exposure region of the photosensitive material. Namely, the photosensitive material will swing around the position at which it is pressed by the pressing member (i.e., will swing with this position being a fulcrum), and the photosensitive material will vibrate to the exposure region thereof. Thus, here, by providing a pressing members at a plurality of (at least two) places in the region from the conveying-direction upstream side of the exposure position to the exposure position or in the region from the conveying-direction downstream side of the exposure position to the exposure position, propagation of vibrations generated at the trailing end or the leading end of the photosensitive material are reliably blocked, and it is possible to prevent non-uniform exposure and offset of the times at which the photosensitive materials are conveyed to the exposure position.

In the fourth aspect of the present invention, one of the pressing members may be a driven roller (an idler) which presses the image recording surface of the photosensitive material.

Because the pressing member is a driven roller which presses the image recording surface of the photosensitive material, the pressing member rotates so as to follow the photosensitive material which is being conveyed while being exposed. Accordingly, even if the photosensitive material is pressed in order to block the propagation of vibrations at the photosensitive material, the image recording surface of the photosensitive material is not damaged. The driven roller may be formed by one roller of the pair of conveying rollers which nips and conveys the photosensitive material (the roller which is not driven), or by a freely-rotatable roller which presses the photosensitive material against the fixed guide, or the like.

The driven roller may be structured so as to be able to move away from a pressing position at which the driven roller presses the photosensitive material.

By moving the driven roller away from the pressing position at the time when the leading end or the trailing end of the photosensitive material passes by, it is possible to prevent the photosensitive material which is undergoing exposure from vibrating and non-uniform exposure from occurring due to the shock at the time when the leading end of the photosensitive material abuts the driven roller, or due to the shock at the time when the trailing end of the photosensitive material comes out from beneath the driven roller.

In the above-described aspect, it is preferable that the pressing members are formed by pairs of conveying rollers which nip and convey the photosensitive material, and that, among the plurality of pairs of conveying rollers which are disposed at either the conveying-direction upstream side or the conveying-direction downstream side of the exposure position, the closer a pair of conveying rollers are to the exposure position, the greater the conveying force of that pair of conveying rollers.

Among the plurality of pairs of conveying rollers conveying the photosensitive material, the closer a pair of conveying rollers are to the exposure position, the greater the conveying force of that pair of conveying rollers. Therefore, the photosensitive material can be conveyed precisely by the pairs of conveying rollers which are disposed immediately before and immediately after the exposure position.

BRIEF DESCRIPTION OF THE DRAWINGS

FIG. 7 is a schematic side view showing a nipping state of a nip releasing mechanism relating to the second embodiment of the present invention.

FIG. 8 is a schematic side view showing a pressing state of the nip releasing mechanism relating to the second embodiment of the present invention.

FIG. 9 is a schematic side view showing a nip released state of the nip releasing mechanism relating to the second embodiment of the present invention.

FIGS. 10A through 10C are explanatory diagrams showing nipped states of pairs of conveying rollers in the subscanning conveying section.

FIGS. 11D through 11H are explanatory diagrams showing nipped states of the pairs of conveying rollers in the subscanning conveying section.

FIGS. 12I through 12K are explanatory diagrams showing nipped states of the pairs of conveying rollers in the subscanning conveying section.

DESCRIPTION OF THE PREFERRED EMBODIMENTS

An image forming device, which includes an image recording device relating to a first embodiment of the present invention, will be described below with reference to the drawings. Then, a subscanning conveying section, which is a main portion of the image recording device, will be described in detail.

(Overall Structure of Image Forming Device)

Figure 1:
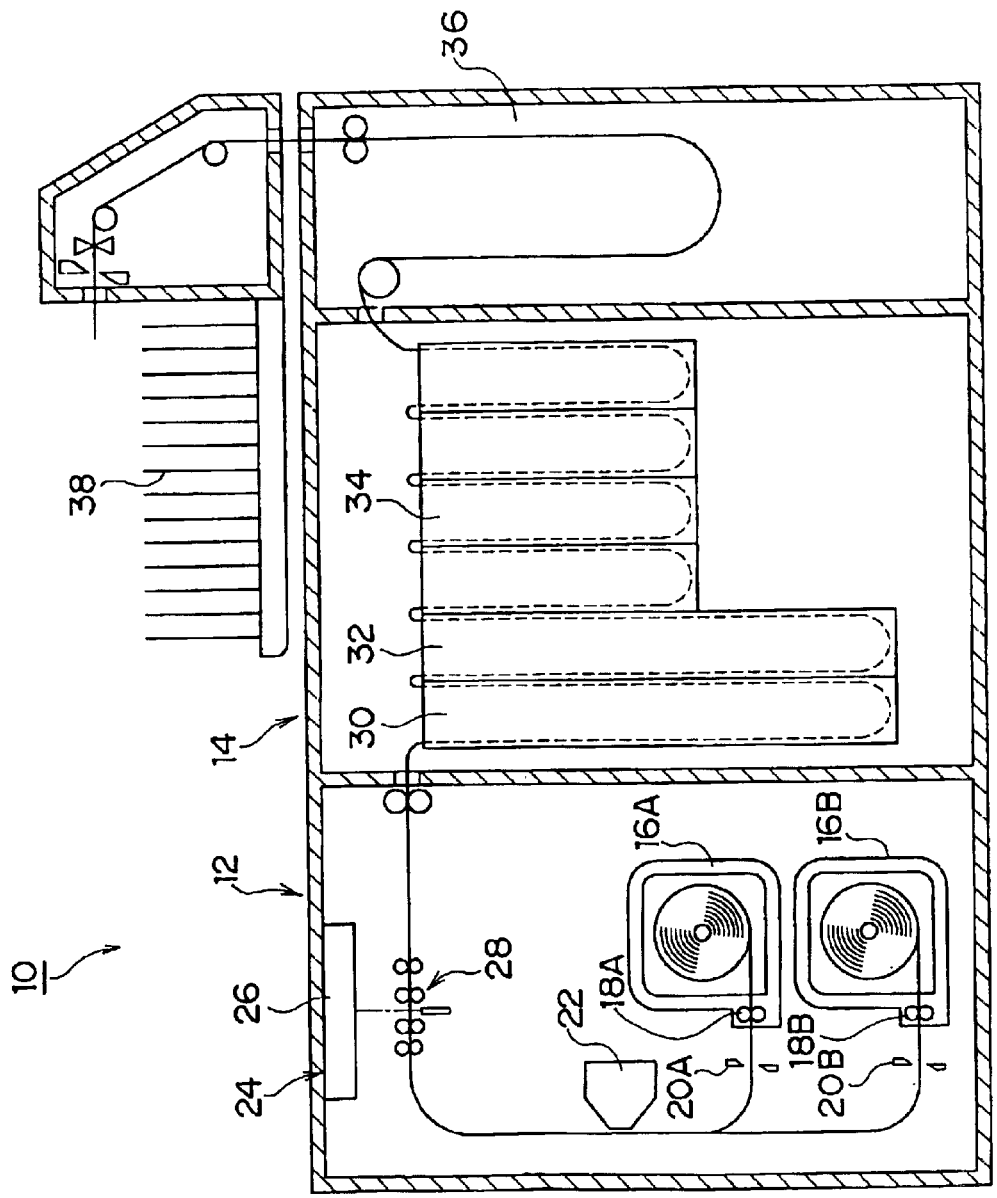
FIG. 1 is a diagram for summarily explaining an image recording device relating to embodiments of the present invention.

An image forming device 10 shown in FIG. 1 is mainly used for image formation in digital photoprinters, and is formed from a printer (image recording device) 12 and a processor 14. The printer 12 scan-exposes photographic printing papers by a light beam so as to form latent images, in accordance with image information read by an image reading device such as a film scanner, and in accordance with exposure conditions which have been determined at a set-up device. The processor 14 subjects the photographic printing papers, on which the latent images have been formed, to developing processing, and outputs prints on which are recorded the images of the film.

As shown in FIG. 1, magazines 16A, 16B are disposed in the printer 12. A photographic printing paper, which is wound in roll form, is accommodated in each of the magazines 16A, 16B. The photographic printing papers, which are pulled-out from the magazines 16A, 16B by pull-out roller pairs 18A, 18B, are cut by cutters 20A, 20B to predetermined lengths so as to form sheet-shaped photographic printing papers A.

A backprint section 22, which prints predetermined information on the back surfaces of the photographic printing papers A, is disposed at the downstream side of the conveying path of the sheet-shaped photographic printing papers A. An exposure section 24, which records predetermined images on the emulsion surfaces of the photographic printing papers A, is provided at the downstream side of the backprint section 22.

The exposure section 24 has a light scanning device 26 which exposes the photographic printing papers A on the basis of predetermined image information, and a subscanning conveying section 28 which accurately conveys the photographic printing papers A to the exposure position and ensures the flatness of the photographic printing papers A.

A developing tank 30, a fixing tank 32, a rinsing tank 34, and a drying section 36 are disposed along the conveying path within the processor 14 in which is conveyed the photographic printing paper A on which a predetermined image was recorded in the exposure section 24. Due to the photographic printing paper A successively passing therethrough, a single print is formed. The print is then discharged to a sorter 38.

(Structure of Subscanning Conveying Section)

The subscanning conveying section 28 in the printer 12 which is formed in this way will be described in detail.

Figure 2:
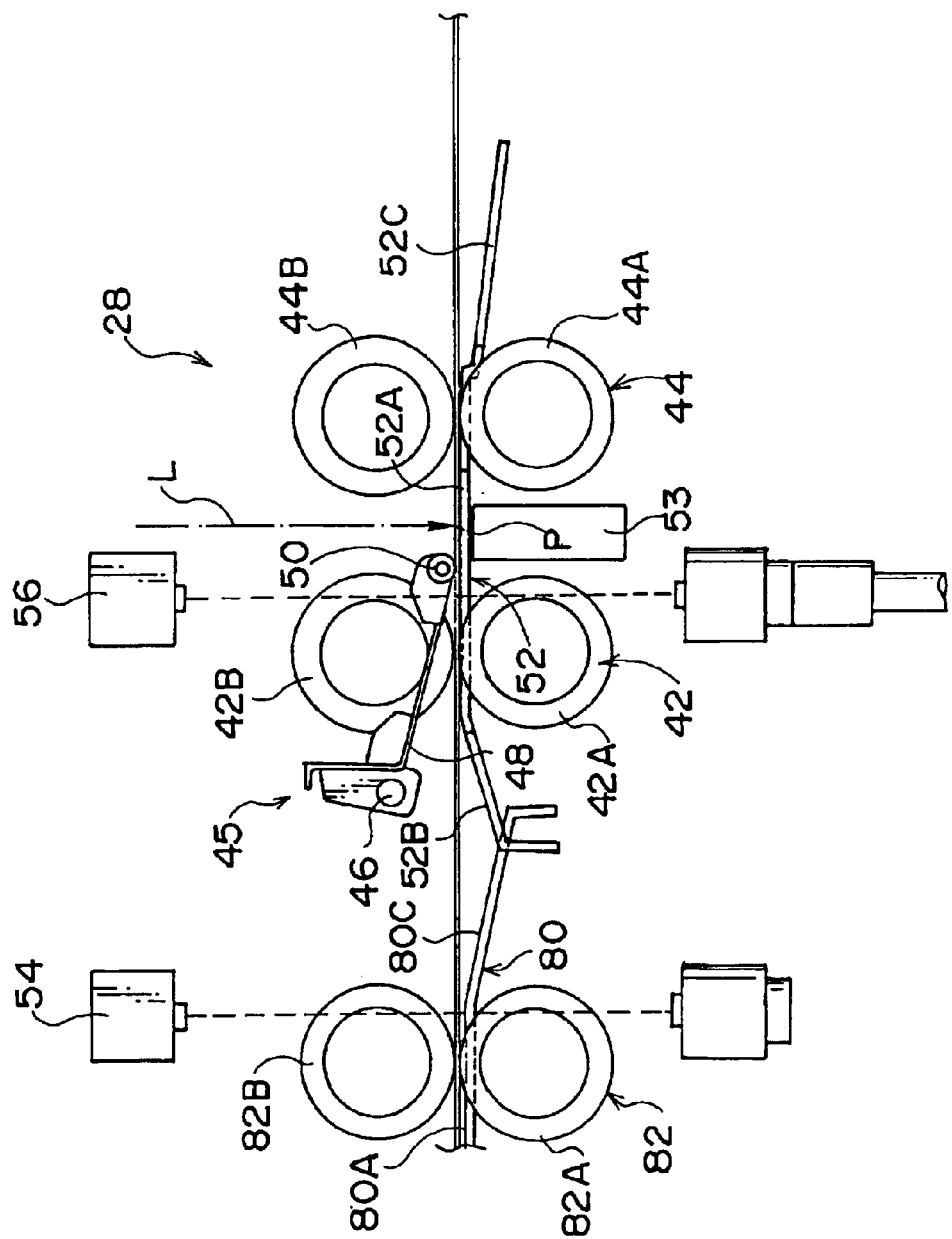
FIG. 2 is a schematic side view of a subscanning conveying section relating to a first embodiment of the present invention.

As shown in FIG. 2, in order to accurately convey the photographic printing paper A, on which an image is to be recorded by laser light L from the light scanning device 26, the subscanning conveying section 28 has pairs of conveying rollers (conveying roller pairs) 42, 44 disposed respectively before and after an exposure position P. The conveying roller pairs 42, 44 are respectively formed by driving rollers 42A, 44A at the lower sides, and nip rollers (driven rollers) 42B, 44B at the upper sides which, together with the driving rollers 42A, 44A, form nips having predetermined nip pressures. A pressing roller 50, which is supported by a swinging mechanism 45, is provided at the exposure position P side of the nip roller 42B. At the swinging mechanism 45, the pressing roller 50 is disposed at the distal end of a swinging member 48 which is freely rotatable around a rotation shaft 46. The pressing roller 50 abuts a flattening guide 52 due to the weight of the swinging member 48, and can move vertically due to the photographic printing paper A entering in.

Figure 3:
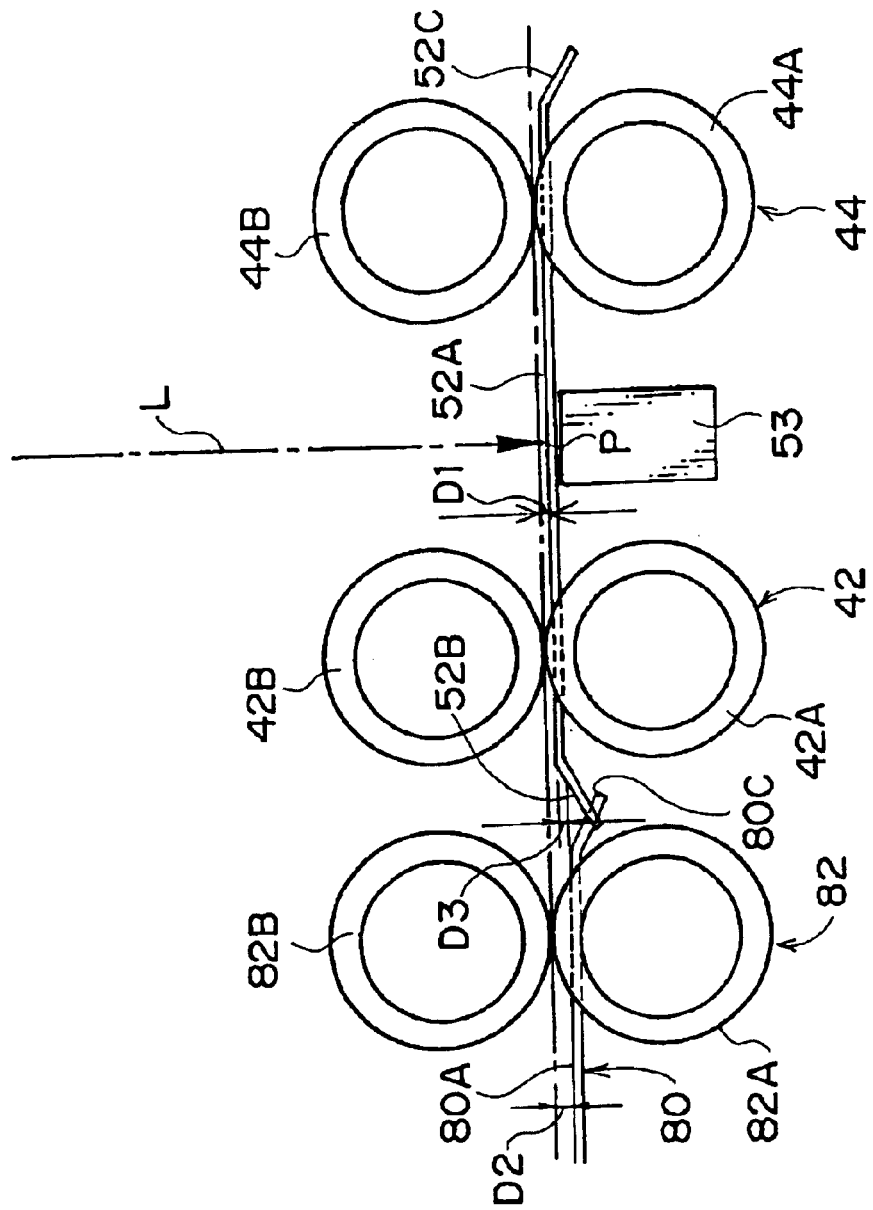
FIG. 3 is a diagram for explanation of the relationship of the arrangement of a flattening guide and pairs of conveying rollers relating to the first embodiment of the present invention.
Figure 4:
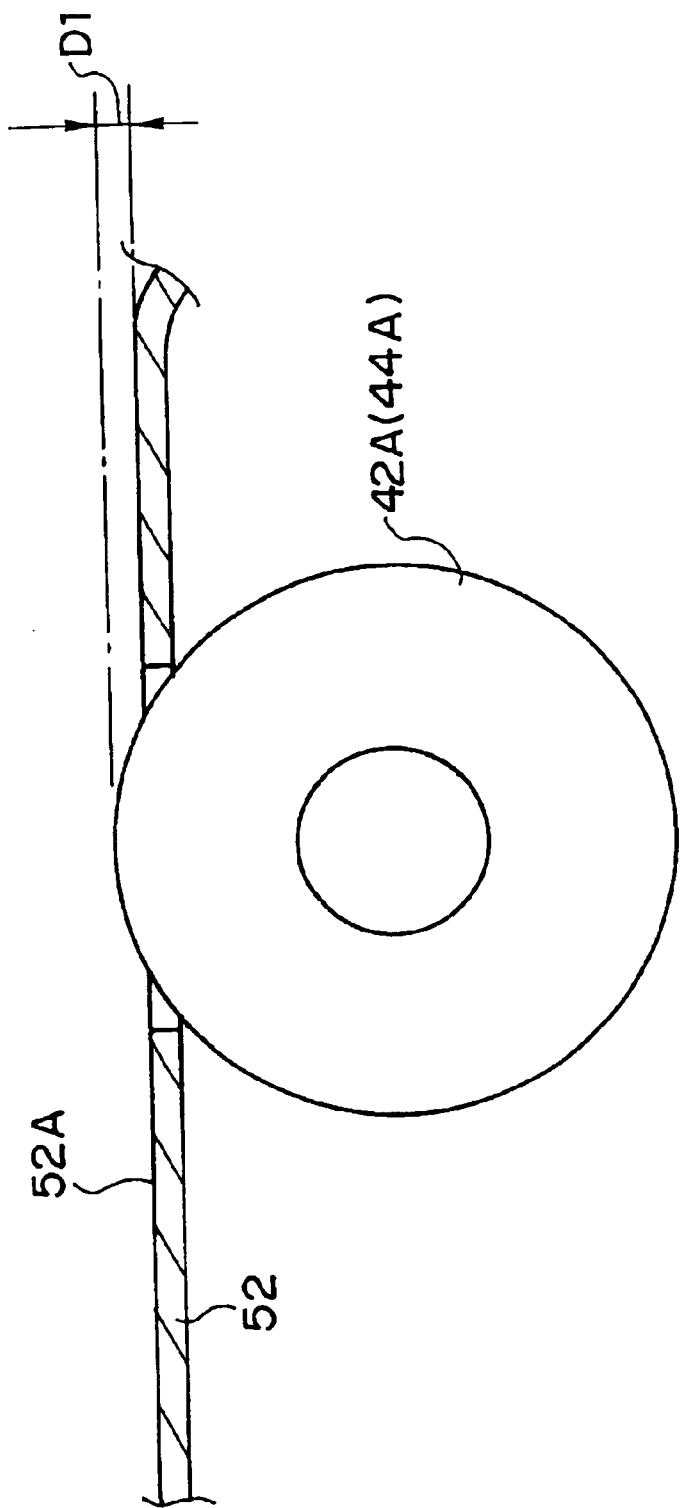
FIG. 4 is a diagram for explanation showing a projected state of the pair of conveying rollers relating to the first embodiment of the present invention.

The flat-plate-shaped flattening guide 52, which is for supporting the back surface of the photographic printing paper A and for ensuring the flatness of the photographic printing paper A, is supported by a support member 53 between the conveying roller pairs 42, 44. The flattening guide 52 is formed from a supporting surface 52A which supports the photographic printing paper A and is formed along the conveying path, and taper surfaces 52B, 52C which are formed before and after the supporting surface 52A. A projecting amount D1 (refer to the schematic views of FIGS. 3 and 4) of the nip position (height) of the conveying roller pairs 42, 44 with respect to the position (height) of the supporting surface 52A of the flattening guide 52, is 5 $\mu$m to 300 $\mu$m, and preferably 20 $\mu$m to 70 $\mu$m. For example, the projecting amount D1 is 50 $\mu$m.

As shown in FIG. 2, a conveying guide 80 which is similar to the flattening guide 52 is disposed at the conveying-direction upstream side of the flattening guide 52. The conveying guide 80 is formed from a supporting surface 80A which supports the photographic printing paper A and is formed along the conveying path, and a taper surface 80C which is formed at the conveying-direction downstream side of the supporting surface 80A. A conveying roller pair 82 (a driving roller 82A and a nip roller 82B), which nips and conveys the photographic printing paper A, is disposed at the position where the conveying guide 80 is disposed. The nip position (height) of the conveying roller pair 82 is substantially the same height as the nip positions (heights) of the conveying roller pairs 42, 44. A projecting amount D2 (refer to the schematic view of FIG. 3) of the nip position (height) of the conveying roller pair 82 with respect to the position (height) of the supporting surface 80A of the conveying guide 80, is 0.1 mm to 0.5 mm, and is 0.2 mm for example.

A step difference D3 between the supporting surface 80A of the conveying guide 80 and the supporting surface 52A of the flattening guide 52 is 1.0 mm or less, and is 0.5 mm for example.

At the distal end of the taper surface 80C of the conveying guide 80, projections and recesses are formed repeatedly along the widthwise direction. Similarly, at the distal end of the taper surface 52B of the flattening guide 52, projections and recesses are formed repeatedly along the widthwise direction. The distal end of the taper surface 80C and the distal end of the taper surface 52B intersect (see FIG. 2) such that the projections of one enter into the recesses of the other. Accordingly, the leading end or trailing end of the photographic printing paper A can be prevented from dropping down between the conveying guide 80 (the taper surface 80C) and the flattening guide 52 (the taper surface 52B), and jams can be avoided.

Light-transmission-type sensors 54, 56 are disposed at the conveying-direction upstream side of the conveying roller pair 42, and immediately before the exposure position P, respectively. These sensors 54, 56 are for detecting jams or the like by detecting the leading ends and trailing ends of photographic printing papers A.

Operation of the printer 12 which is structured in this way will be described.

When image information is inputted to the printer 12, a predetermined length of the photographic printing paper A is pulled out from the magazine which accommodates the photographic printing paper A whose width corresponds to that image information, e.g., is pulled out from the magazine 16A by the pull-out rollers 18A, and the photographic printing paper A is cut at the cutter 20A. A sheet-shaped photographic printing paper A of a predetermined size is thereby formed.

Printing onto the reverse surface of the photographic printing paper A, which is disposed and conveyed in this way, is carried out at the backprint section 22, and thereafter, the photographic printing paper A reaches the subscanning conveying section 28.

As shown in FIG. 2, the leading end of the photographic printing paper A, which has reached the subscanning conveying section 28, enters into the conveying roller pair 82 which is forming a nip.

The leading end of the photographic printing paper A, which is nipped by the conveying roller pair 82, is conveyed from the supporting surface 80A of the conveying guide 80 onto the taper surface 80C thereof. Namely, the leading end of the photographic printing paper A travels downwardly along the taper surface 80C of the conveying guide 80. However, because the distal end of the taper surface 80C and the distal end of the taper surface 52B intersect one another, the photographic printing paper A moves smoothly onto the taper surface 52B, and travels upwardly along the taper surface 52B.

As a result, the leading end of the photographic printing paper A moves from the taper surface 52B of the flattening guide 52 to the supporting surface 52A, and enters into the conveying roller pair 42 which are forming a nip. At this time, the amount of projection D1 of the nip position (the driving roller 42A) of the conveying roller pair 42 with respect to the supporting surface 52A of the flattening guide 52 is 50 $\mu$m which is extremely small. Therefore, vibration when the photographic printing paper A enters in between the conveying roller pair 42 is suppressed. The same holds with respect to the conveying roller pair 44 as well.

The leading end of the photographic printing paper A, which is being nipped by the conveying roller pair 42, is pressed against the supporting surface 52A of the flattening guide 52 by the pressing roller 50, such that the flatness is maintained.

The photographic printing paper A, which has reached the exposure position P in this state, is exposed by the scanning light L in a state in which the flatness of the photographic printing paper A is maintained, and without the photographic printing paper A rising up off of the supporting surface 52A of the flattening guide 52. Therefore, highly accurate image recording can be carried out. In particular, even if vibrations are generated at the rear end side of the photographic printing paper A, the photographic printing paper A is pressed at two places by the conveying roller pair 42 and the pressing roller 50. Therefore, it is possible to reliably block the propagation of vibrations to the exposure region of the photographic printing paper A. Namely, if the photographic printing paper A were to be pressed at only one place between the exposure position P and the position where the vibration was generated, there would be the concern that the photographic printing paper A would swing around the pressed position (i.e., with the pressed position serving as a fulcrum) and that the exposure position side of the photographic printing paper A also would vibrate. However, in the present embodiment, the photographic printing paper A is pressed at two points (two places) between the exposure position and the position at which the vibration is generated. Therefore, it is possible to reliably block the propagation of vibration to the exposure region.

When the trailing end of the photographic printing paper A which is undergoing exposure comes out from the conveying roller pair 82 which is nipped together, vibration of the photographic printing paper A due to the shock at the time when the trailing end thereof comes out (the shock of the photographic printing paper A falling down onto the supporting surface 80A of the conveying guide 80 from on the driving roller 82A) is suppressed because the projection amount D2 of the nip position (height) of the conveying roller pair 82 with respect to the supporting surface 80A of the conveying guide 80 is 0.2 mm which is small. Further, the trailing end of the photographic printing paper A moves on the supporting surface 52A of the flattening guide 52 via the taper surface 80C and the taper surface 52B which are combined so as to intersect one another. Moreover, the step difference D3 (see FIG. 3) between the supporting surface 80A of the conveying guide 80 and the supporting surface 52A of the flattening guide 52 over which the trailing end of the photographic printing paper A passes is 0.5 mm which is small. For these reasons, vibration of the photographic printing paper A caused by the trailing end thereof passing over this stepped portion can be greatly suppressed.

Even when vibrations are generated due to the trailing end of the photographic printing paper A which is undergoing exposure riding over the driving roller 82A or passing over the step portion between the conveying guide 80 and the flattening guide 52, the vibrations do not propagate to the exposure region of the photographic printing paper A because the photographic printing paper A is nipped by the conveying roller pair 42 and is pressed against the supporting surface 52A of the flattening guide 52 by the pressing roller 50, i.e., because the photographic printing paper A is pressed at two places between the exposure position P and the position where the vibrations are generated.

Moreover, even after the trailing end of the photographic printing paper A has come out from the conveying roller pair 42 which is nipped together, the pressing roller 50 is pressing the trailing end of the photographic printing paper A. Therefore, flying-up of the trailing end of the photographic printing paper A is suppressed.

In this way, at the subscanning conveying section 28 relating to the present embodiment, the projection amount D1 of the nip positions of the conveying roller pairs 42, 44 with respect to the supporting surface 52A of the flattening guide 52 at the exposure position is 50 μm (is from 5 μm to 300 μm) which is extremely small. In this way, vibrations which are caused by the shock generated at the time when the leading end or the trailing end of the photographic printing paper A rides up to the nip positions of the conveying roller pairs 42, 44 (the peak portions of the driving rollers 42A, 44A) from the supporting surface 52A of the flattening guide 52, and vibrations which are caused by the shock generated at the time when the leading end or the trailing end of the photographic printing paper A drops down onto the supporting surface 52A of the flattening guide 52 from the nip positions of the conveying roller pairs 42, 44, are suppressed, and good image recording is ensured.

Note that the photographic printing paper A is conveyed well because the nip positions of the conveying roller pairs 42, 44 project only slightly more than the supporting surface 52A of the flattening guide 52.

Also when the trailing end of the photographic printing paper A passes through the conveying roller pair 82, vibration of the photographic printing paper A is similarly suppressed because the projection amount D2 of the nip position of the conveying roller pair 82 with respect to the supporting surface 80A of the conveying guide 80 is small (0.1 mm to 0.5 mm).

The stepped amount D3 between the flattening guide 52 (the supporting surface 52A) at the exposure position P and the conveying guide 80 (the supporting surface 80A) adjacent thereto is kept to 1.0 mm or less. Therefore, vibration accompanying the passage of the trailing end of the photographic printing paper A over this region is suppressed.

Figure 5:
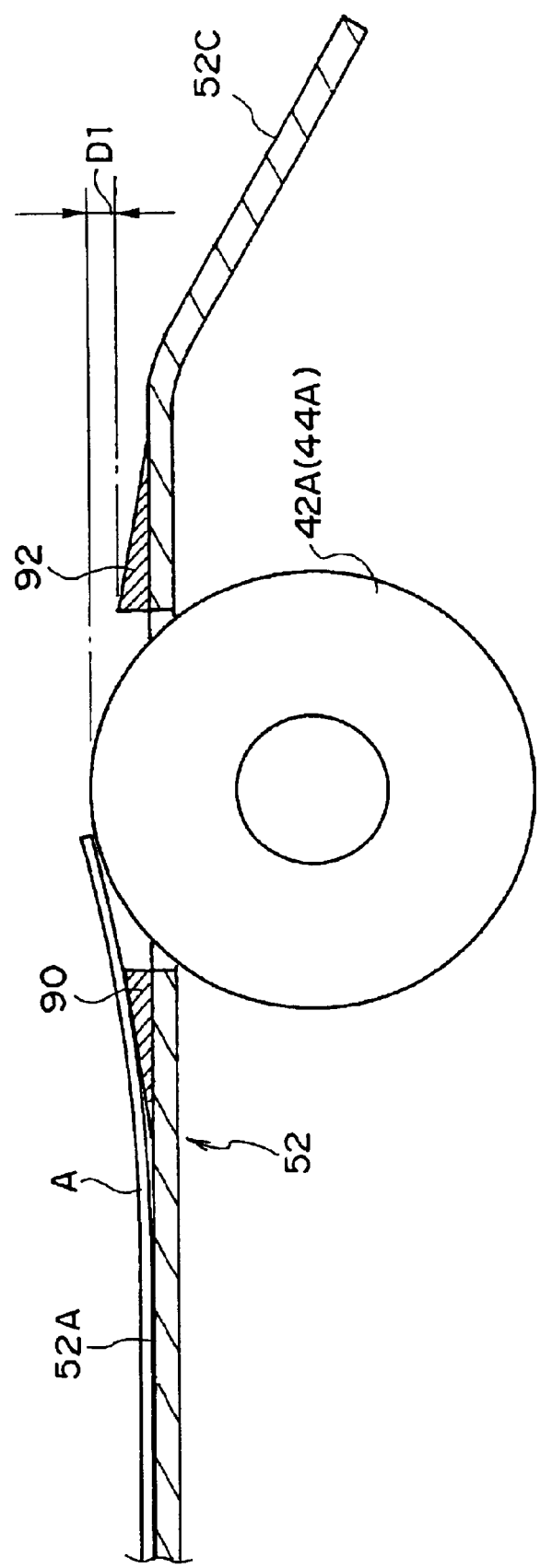
FIG. 5 is a diagram for explanation showing a projected state of a pair of conveying rollers relating to another example of the present invention.

In the present embodiment, the projecting amount D1 of the nip positions of the conveying roller pairs 42, 44 (the maximum heights of the driving rollers 42A, 44A) is stipulated with respect to the supporting surface 52A of the flattening guide 52. However, as shown in FIG. 5, slopes 90, 92 which are inclined surfaces may be provided at the supporting surface 52A of the flattening guide 52, and the projecting amount D1 may be stipulated with respect to the maximum heights of the slopes 90, 92. In accordance with such a structure, the shock when the leading end of the photographic printing paper A rides up onto the driving rollers 42A, 44A or when the leading end of the photographic printing paper A drops down onto the flattening guide 52 from the driving rollers 42A, 44A is suppressed, and vibration generated at the photographic printing paper A is reduced. Further, because the projecting amount D1 can be adjusted at the slopes 90, 92, there is the advantage that it suffices for the assembly accuracy of the conveying roller pairs 40, 42 and the supporting surface 52A of the flattening guide 52 to be rough.

Further, the flattening guide 52 can be formed by a single plate to a size which enables the photographic printing paper A which is undergoing exposure to be placed completely thereon, thereby obviating the problem of the step D3 between the conveying guide 80 and the flattening guide 52.

When, as in the present embodiment, the projecting amounts D1, D2 are made to be minima in order to keep vibration of the photographic printing paper A to a minimum, when the rollers forming the conveying roller pairs 42, 44, 82 are rubber rollers, the amount of deformation at the time of nipping is great. There is the concern that the nip positions will become lower than the positions of the supporting surface 52A of the flattening guide 52 or the supporting surface 80A of the conveying guide 80, and that slight deviation will arise in the conveying amount of the photographic printing paper A. On the other hand, if metal rollers are used as the conveying rollers in order to suppress the amount of deformation, the nipping force decreases.

Thus, for the driving rollers 42A, 44A, 82A forming the conveying roller pairs 42, 44, 82, rollers are used in which a rubber layer of a thickness of 1 mm is formed on the outer periphery of a metal roller, and thick rubber rollers are used for the nip rollers 42B, 44B, 82B. In this way, the conveyability by the nipping can be ensured, and deformation of the driving roller 42A, 44A, 82A (lowering of the nip position) can be prevented such that slight deviation in the conveying amount can be prevented.

In the present embodiment, explanation was given of the conveying guide 80 and the conveying roller pair 82 disposed at the conveying-direction upstream side of the flattening guide 52. However, a similar conveying guide and conveying roller pair may be provided at the conveying-direction downstream side of the flattening guide 52, and the same operation and effects can be achieved.

An image recording device relating to a second embodiment of the present invention will now be described. Structural elements which are the same as those of the first embodiment are denoted by the same reference numerals, and detailed description thereof will be omitted. In the second embodiment, the only portion which differs from the first embodiment is the subscanning conveying section 28, and this portion will be described.

Figure 6:
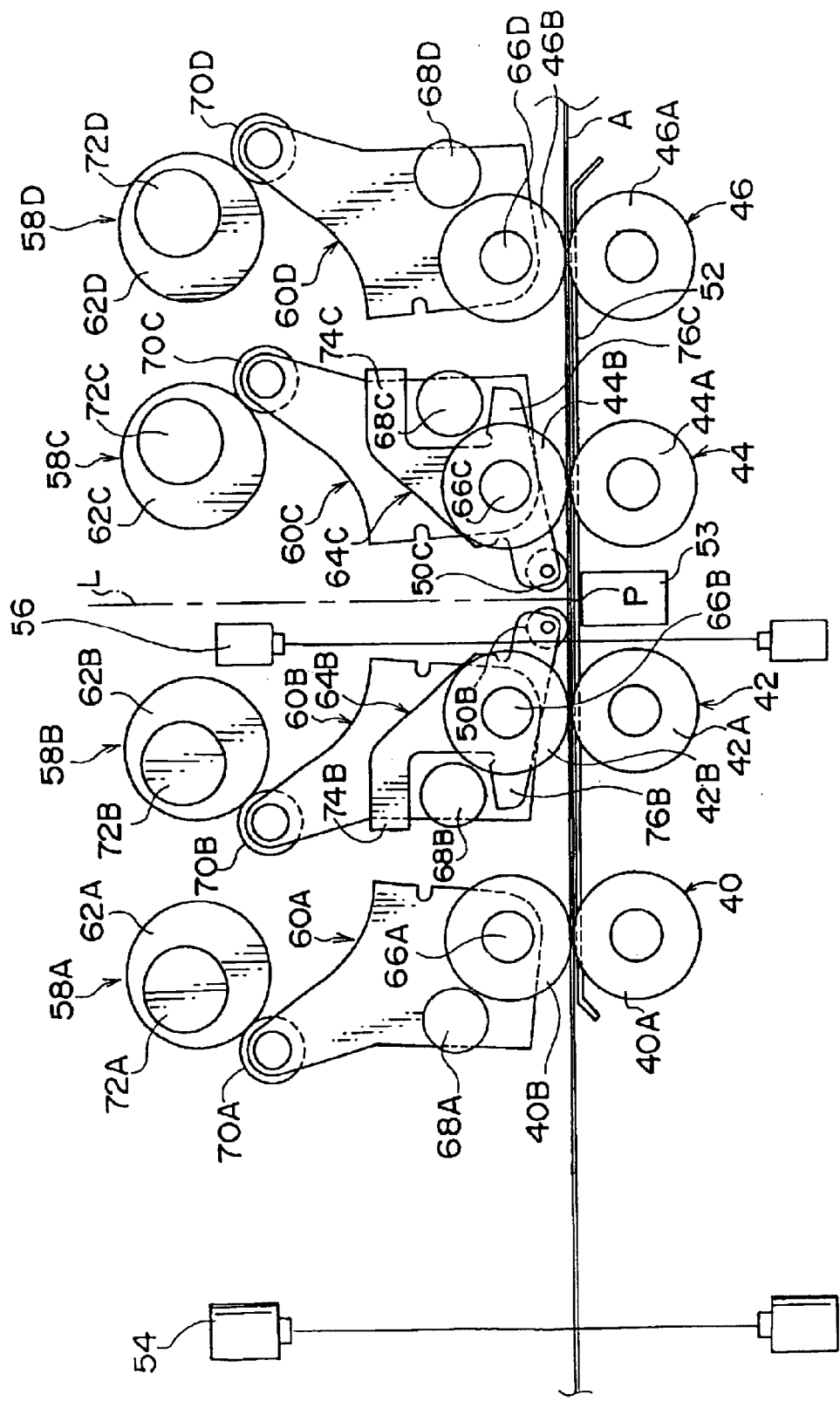
FIG. 6 is a schematic side view showing a subscanning conveying section relating to a second embodiment of the present invention.

As shown in FIG. 6, in order to accurately convey the photographic printing paper A on which an image is to be recorded by laser light L from the light scanning device 26 (see FIG. 1), conveying roller pairs 40, 42, 44, 46 are disposed before and after the exposure position P. The conveying roller pairs 40, 42 are disposed before the exposure position P, and the conveying roller pairs 44, 46 are disposed after the exposure position P. The conveying roller pairs 40, 42, 44, 46 are formed by driving rollers 40A, 42A, 44A, 46A at the lower sides, and nip rollers 40B, 42B, 44B, 46B which are driven rollers at the upper sides, respectively. The nip rollers 40B, 42B, 44B, 46B are structured so as to be able to form nips with the driving rollers 40A, 42A, 44A, 46A and such that the nips can be released, by nip releasing mechanisms 58A, 58B, 58C, 58D which will be described later. Pressing rollers 50B, 50C are disposed at the exposure position P sides of the nip rollers 42B, 44B which are located immediately before and immediately after the exposure position P. The pressing rollers 50B, 50C are structured so as to operate interlockingly with the nip rollers 42B, 44B and so as to be able to be switched between pressing positions at which the pressing rollers 50B, 50C press the photographic printing paper A against the flattening guide 52, and released positions at which the pressing rollers 50B, 50C are set apart from the flattening guide 52, as will be described later.

Between the conveying roller pairs 40, 42, 44, 46, the flat-plate-shaped flattening guide 52, which is for supporting the back surface of the photographic printing paper A and for ensuring the flatness of the photographic printing paper A, is supported by the supporting member 53.

The light-transmission-type sensors 54, 56 are disposed at the conveying-direction upstream side of the conveying roller pair 40, and immediately before the exposure position P, respectively. Due to the sensors 54, 56 detecting the leading end and trailing end of the photographic printing paper A, the timing for nipping and releasing of the nips of the conveying roller pairs 40, 42, 44, 46 is controlled, and non-uniform exposure is suppressed.

Next, the structure of the nip releasing mechanisms 58A, 58B, 58C, 58D will be described. The nip releasing mechanisms 58B, 58C have similar structures. Further, the nip releasing mechanisms 58A, 58D have structures in which some portions of the nip releasing mechanism 58B are removed. Thus, the nip releasing mechanism 58B will be described as a representative example, and explanation of the other nip releasing mechanisms will be omitted.

The nip releasing mechanism 58B makes the nip roller 42B abut and move away from the driving roller 42A, and makes the pressing roller 50B abut and move away from the photographic printing paper A.

As shown in FIG. 7, the nip releasing mechanism 58B is basically structured from a swinging member 60B which swingably supports the nip roller 42B; an eccentric cam 62B which displaces the swinging member 60B; and a swinging member 64B which operates interlockingly with the displacement of the swinging member 60B and which holds the pressing roller 50B such that the pressing roller 50B is displaceable.

The swinging member 60B is a member which pivotally supports an end portion of a rotation shaft 66B of the nip roller 42B, and is freely rotatable around a rotation shaft 68B. A helical spring is coiled around the rotation shaft 68B, such that the swinging member 60B is urged clockwise in the figure, i.e., in the direction in which the nip roller 42B forms a nip with the driving roller 42A. Moreover, an abutment portion 70B, which is supported so as to be freely rotatable at the swinging member 60B and which abuts the eccentric cam 62B, is provided at the upper end of the swinging member 60B. The abutment portion 70B always abuts the eccentric cam 62B due to the aforementioned urging force.

The eccentric cam 62B rotates around a rotation shaft 72B due to drive force of an unillustrated drive motor, and is rotated in the opposite direction against the urging force of the swinging member 60B which is usually urged clockwise. In this way, the nip of the nip roller 40B is released.

The swinging member 64B pivotally supports both end portions of a rotation shaft 73B of the pressing roller 50B, and swings freely around the rotation shaft 66B of the nip roller 42B. Due to the urging force of a helical spring coiled around the rotation shaft 66B, the swinging member 64B is urged clockwise in the figure. On the other hand, projections 74B, 76B are formed at the swinging member 64B at the side of the rotation shaft 66B opposite the side at which the pressing roller 50B is located. The rotation shaft 68B is disposed so as to be accommodated in a recess 78B formed between the projections 74B, 76B. Accordingly, in a state in which the nip is released, the projection 76B of the swinging member 64B which is urged clockwise is in a state of abutting the rotation shaft 68B (see FIG. 9). Namely, the projection 76B restricts the amount of rotation of the swinging member 64B accompanying the nip releasing operation of the nip roller 42B (the operation of the swinging member 60B moving away from the flattening guide 52), and the projection 76B carries out the operation of moving the pressing roller 50B away from the flattening guide 52. Operation proceeds from the state shown in FIG. 7 through the state shown in FIG. 8 to the state shown in FIG. 9.

As shown in FIG. 6, the nip releasing mechanisms 58A, 58D have a structure in which the swinging member 64B and the pressing roller 50B are removed from the nip releasing mechanism 58B. Namely, the nip releasing mechanisms 58A, 58D are structured such that only the respective conveying roller pairs 40, 46 thereof form a nip and the nip is released.

Note that, in the following explanation, there are cases in which the state shown in FIG. 7 is called the nip position, the state shown in FIG. 8 is called the pressing position, and the state shown in FIG. 9 is called the released position.

Operation of the printer 12 which is structured in this way will now be described.

As shown in FIG. 1, when image information is inputted to the printer 12, a predetermined length of the photographic printing paper is pulled out from the magazine which accommodates the photographic printing paper whose width corresponds to that image information, e.g., is pulled out from the magazine 16A by the pull-out rollers 18A, and the photographic printing paper is cut by the cutter 20A. A sheet-shaped photographic printing paper A of a predetermined size is thereby formed.

Printing onto the reverse surface of the photographic printing paper A, which is disposed and conveyed in this way, is carried out at the backprint section 22, and thereafter, the photographic printing paper A reaches the subscanning conveying section 28.

Hereinafter, the method of conveying at the subscanning conveying section 28 (the way of ensuring the flatness of the photographic printing paper A), and the sequence of the nipping and nip releasing of the conveying roller pairs 40, 42, 44, 46 shown in the schematic views of FIG. 10A through FIG. 12K, will be described in detail.

Before the leading end of a photographic printing paper A2 reaches the position of the conveying roller pair 40, the nip roller 40B is made to form a nip with the driving roller 40A due to the driving of the nip releasing mechanism 58A (see from FIG. 10A to FIG. 10B).

Namely, by a signal outputted from a control section on the basis of a photographic printing paper A leading end detecting signal from the sensor 54, an unillustrated driving motor of the nip releasing mechanism 58A is driven, and the eccentric cam 62A is rotated by a predetermined angle counterclockwise around a rotation shaft 72A. In this way, a swinging member 60A, which is urged clockwise by the helical spring, rotates clockwise around a rotation shaft 68A, and the nip roller 40B, which is pivotally supported by a rotation shaft 66A, is made to form a nip with the driving roller 40A (refer to from FIG. 9 to FIG. 7).

The leading end of the photographic printing paper A2 enters in between the conveying roller pair 40, which has been made to form a nip in this way, and is nipped by the conveying roller pair 40 (see FIG. 10C).

At a predetermined time after the sensor 54 detects the leading end of the photographic printing paper A2, the nip releasing mechanism 58B is driven. The nip roller 42B forming the conveying roller pair 42 forms a nip with the driving roller 42A, and the pressing roller 50B moves to the pressing position (see FIG. 11D).

As a result, the photographic printing paper A2 enters in between the conveying roller pair 42 forming a nip, such that the photographic printing paper A2 is reliably nipped. Moreover, rising up of the photographic printing paper A2 is suppressed by the pressing roller 50B (see FIG. 11E).

On the other hand, when the leading end of the photographic printing paper A2 is detected by the sensor 56, the nip of the conveying roller pair 44 is released by the nip releasing mechanism 58C (see FIG. 11E). Specifically, when a photographic printing paper A2 leading end detecting signal is inputted to the control section from the sensor 56, the driving motor of the nip releasing mechanism 58C is driven on the basis of a drive signal from the control section, and an eccentric cam 62C is rotated counterclockwise. In this way, the eccentric cam 62C pushes an abutment portion 70C of a swinging member 60C. As a result, the swinging member 60C rotates counterclockwise around a rotation shaft 68C, and the nip roller 44B is moved apart from the driving roller 44A (refer to from FIG. 7 to FIG. 9).

In this way, before the photographic printing paper A2 reaches the conveying roller pair 44, the nip of the conveying roller pair 44 is released, and the pressing roller 50C is moved apart from the flattening guide 52 (the pressing is released). The reason for this is that there is the concern that, due to the shock of the leading end of the photographic printing paper A2 which is undergoing exposure abutting the nipped conveying roller pair 44 or the pressing roller 50C at the pressing position, the exposure region of the photographic printing paper A2 will vibrate and non-uniform exposure will occur. Accordingly, generation of the aforementioned vibration at the time when the leading end of the photographic printing paper A2 reaches the positions of the presser roller 50C and the conveying roller pair 44 can be avoided, and good image recording can be carried out (see FIG. 11F).

At this time, the leading end of the photographic printing paper A, which has passed by the exposure position, is free up to the point when it is pressed by the pressing roller 50C. However, the conveying roller pair 42 at the conveying-direction upstream side is nipping the photographic printing paper A, and the pressing roller 50B, which is disposed further toward the exposure position P than the conveying roller pair 42 is, is suppressing rising-up of the photographic printing paper A2. Therefore, precise image recording can be carried out. Moreover, if, for example, only the conveying roller pair 42 were to press the photographic printing paper A, the photographic printing paper A would swing around the pressing position, and the portion of the photographic printing paper A up to the exposure region thereof would vibrate. However, in the present embodiment, the photographic printing paper A is pressed at two places by the conveying roller pair 42 and the presser roller 50B. Therefore, as described above, it is possible to prevent the photographic printing paper A from swinging and the exposure region of the photographic printing paper A from vibrating. Accordingly, good image recording is possible.

By using the time at which the leading end of the photographic printing paper A2 is detected at the sensor 56 as a reference, laser light is scanned by the light scanning device 26, and an image (latent image) is recorded two-dimensionally on the photographic printing paper A2 which has reached the exposure position (refer to from FIG. 11F to FIG. 12J).

Further, at a time after the leading end of the photographic printing paper A2 has passed by the position of the presser roller 50C, the presser roller 50C is lowered onto the flattening guide 52 (is moved from the released position to the pressing position). Further, at a time after the leading end of the photographic printing paper A2 has passed by the position of the conveying roller pair 44, the nip roller 44B is made to form a nip with the driving roller 44A (see FIG. 11G and FIG. 11H). Namely, after the leading end of the photographic printing paper A2 has passed by the positions of the pressing roller 50C and the conveying roller pair 44, the photographic printing paper A2 is pressed and nipped, respectively. In this way, the propagation of vibrations from the conveying-direction downstream side of the photographic printing paper A2 which is undergoing exposure can be suppressed. Further, rising-up of the photographic printing paper A2 is suppressed, the flatness thereof is ensured, and precise image recording is carried out.

Specifically, an unillustrated driving motor is driven, and first, the eccentric cam 62C is rotated from the released position to the pressing position, and the pressing roller 50C thereby presses the photographic printing paper A2 (see FIG. 11G). In this way, the leading end of the photographic printing paper A2 which was free is quickly pressed in a vicinity of the exposure position P, and rising-up of the photographic printing paper A2 is prevented. Moreover, due to the driving of the driving motor, the eccentric cam 62C is rotated from the pressing position to the nip position, and the photographic printing paper A2 is nipped by the nip roller 44B and the driving roller 44A (see FIG. 11H).

Because the pressing roller 50C is freely rotatable, at the time of pressing the photographic printing paper A, the pressing roller 50C rotates such that damage to the emulsion surface of the photographic printing paper A can be prevented.

Moreover, before the leading end of the photographic printing paper A2 reaches the position of the conveying roller pair 46, the nip of the conveying roller pair 46 is released (see FIG. 11G). This is in order to prevent non-uniform exposure due to the shock (vibration) caused by the leading end of the photographic printing paper A2 abutting the nipped conveying roller pair 46, because the photographic printing paper A2 is undergoing exposure at the point in time when the leading end thereof reaches the position of the conveying roller pair 46.

Before the trailing end of the photographic printing paper A2 passes through the conveying roller pair 42, the nip of the conveying roller pair 42 is released (refer to from FIG. 11H to FIG. 12I). This is in order to avoid effects on the exposure state due to the photographic printing paper A2 vibrating due to the shock at the time when the trailing end of the photographic printing paper A2 comes out from the conveying roller pair 42 which is in a nipped state. Specifically, the driving motor is driven, and the eccentric cam 62B is rotated from the nip position to the pressing position. The nip of the nip roller 42B is thereby released.

However, at this time, the pressing by the pressing roller 50B is not released (see FIG. 12I). This is in order to ensure the flatness (prevent the rising-up) of the photographic printing paper A2 at the exposure position by pressing the photographic printing paper A2 up to a time immediately before the trailing end of the photographic printing paper A2 passes thereby.

Then, the pressing by the pressing roller 50B is released before the trailing end of the photographic printing paper A2 passes by (see FIG. 12J). Specifically, pressing by the pressing roller 50B is released due to the driving motor driving and the eccentric cam 62B being rotated from the pressing position to the releasing position.

Moreover, when the leading end of the photographic printing paper A2 passes by the position of the conveying roller pair 46 (i.e., when exposure of the photographic printing paper A2 is completed), the nip roller 46B and the driving roller 46A nip the photographic printing paper A2, and the photographic printing paper A2 is reliably conveyed (see FIG. 12K).

By controlling the nipping operations of the roller pairs in this way, the following operational effects are exhibited.

Namely, the pressing rollers 50B, 50C are disposed further toward the exposure position than are the conveying roller pairs 42, 44 which are immediately before and immediately after the exposure position, respectively. Thus, flying-up of the leading end and the trailing end of the photographic printing paper A at the exposure position P can be reliably suppressed, and non-uniform exposure can be suppressed.

While the photographic printing paper A is undergoing exposure, the photographic printing paper A is pressed at at least two positions (by the conveying roller pair and the pressing roller) at the conveying-direction upstream side or the conveying-direction downstream side of the exposure position P. (In the case of the photographic printing paper A2, refer to FIG. 11F through FIG. 12J.) Thus, propagation of vibration, which is generated toward the leading end or the trailing end of the photographic printing paper A, is blocked at the pressed position of the photographic printing paper A, and the exposure region of the photographic printing paper A does not vibrate. As a result, good image recording in which non-uniform exposure is suppressed is possible.

In the second embodiment as well, the same operational effects as those of the first embodiment are obtained by stipulating the amount of projection of the nip positions of the conveying roller pairs 40, 42, 44, 46 with respect to the supporting surface 52A of the flattening guide 52, or by stipulating the stepped amount between the flattening guide 52 and the conveying guide adjacent thereto.

Note that, among the conveying roller pairs 40, 42, the conveying force of the conveying roller pair 42 which is at the exposure position P side is greater. The same holds for the conveying roller pairs 44, 46. Accordingly, by strongly nipping the photographic printing paper A at the conveying roller pairs 42, 44, the photographic printing paper A at the exposure position P is conveyed precisely, and good image recording can be achieved.

In the image recording device relating to the present invention, by suppressing the generation and propagation of vibration at a sheet-shaped photosensitive material, it is possible to carry out good image recording.

What is claimed is:

1. An image recording device having an exposure position, for exposing a photosensitive material at the exposure position to record an image on the photosensitive material, said image recording device comprising:
    a fixed guide having a supporting surface which supports the photosensitive material at the exposure position; and
    a pair of conveying rollers disposed near the exposure position, nipping the photosensitive material therebetween, and conveying the photosensitive material in a predetermined direction,
    wherein a nip formed by the pair of conveying rollers is positioned so as to project 5 $\mu$m to 300 $\mu$m from the supporting surface.

2. An image recording system, comprising:
    the image recording device of claim 1, and
    the photosensitive material, supported on the fixed guide, having a size and sheet shape formed by virtue of having been cut in a predetermined length in a conveying direction;
    wherein the fixed guide comprises one flat plate of a size which can support the entire photosensitive material.

3. An image recording device having an exposure position, for exposing a photosensitive material at the exposure position to record an image on the photosensitive material, said image recording device comprising:
    a fixed guide having a supporting surface which supports the photosensitive material at the exposure position;
    a conveying guide disposed adjacent, in a conveying-direction, to the fixed guide, and having a supporting surface which supports the photosensitive material; and
    a pair of conveying rollers nipping the photosensitive material therebetween, and conveying the photosensitive material in a predetermined direction, a nip formed by the pair of conveying rollers being positioned so as to project above the conveying guide, wherein the nip formed by the pair of conveying rollers is positioned so as to project 0.1 to 0.5 mm from the supporting surface of the conveying guide and further comprising another pair of conveying rollers disposed near the exposure position between the pair of conveying rollers and the exposure position.

4. The image recording device of claim 3, wherein a nip formed by said another pair of conveying rollers is positioned so as to project 5 $\mu$m to 300 $\mu$m from the supporting surface of the fixed guide.

5. The image recording device of claim 3, wherein a height of the nip formed by the pair of conveying rollers and a height of the nip formed by said another pair of conveying rollers are substantially the same.

6. An image recording system, comprising:

the image recording device of claim 3, and the photosensitive material, supported on the fixed guide, having a size and sheet shape formed by virtue of having been cut in a predetermined length in a conveying direction, wherein the fixed guide and the conveying guide are integrally formed and comprise a flat plate of a size which can support the entire photosensitive material.

7. An image recording device having an exposure position, for exposing a photosensitive material, which is conveyed in a predetermined direction, at the exposure position, to record an image on the photosensitive material, said image recording device comprising:

a fixed guide having a supporting surface which supports the photosensitive material at the exposure position;

a conveying guide disposed adjacent, in a conveying-direction, to the fixed guide, and having a supporting surface which supports the photosensitive material, wherein a step between the supporting surface of the fixed guide and the supporting surface of the conveying guide is 1.0 mm or less.

8. An image recording system, comprising:

the image recording device of claim 7, and the photosensitive material, supported on the fixed guide, having a size and sheet shape formed by virtue of having been cut in a predetermined length in a conveying direction, wherein the fixed guide and the conveying guide are integrally formed, and comprise a flat plate of a size which can support the entire photosensitive material.

9. An image recording device having an exposure position, for exposing a surface of a photosensitive material, which is conveyed in a predetermined direction, at the exposure position to record an image on the surface of the photosensitive material, said image recording device comprising:

a plurality of pressing members, which are disposed at at least one of a conveying-direction upstream side and a conveying-direction downstream side of the exposure position, are respectively disposed at different positions in the conveying direction, press the photosensitive material undergoing exposure, and block propagation of vibration generated at the photosensitive material.

10. The image recording device of claim 9, further comprising a supporting surface which supports the photosensitive material, wherein at least one of the pressing members comprises a driven roller which presses an image recording surface of the photosensitive material toward the supporting surface.

11. The image recording device of claim 10, wherein the driven roller is movably mounted to approach and move away from the photosensitive material.

12. The image recording device of claim 11, wherein, when a portion of the photosensitive material is positioned at the exposure position, the driven roller moves so as to begin to contact the photosensitive material, in a state in which the photosensitive material which has been conveyed is positioned between the driven roller and the supporting surface.

13. The image recording device of claim 12, further comprising a sensor for detecting a position of the photosensitive material, wherein movement of the driven roller is carried out on the basis of a detection operation of the sensor.

14. The image recording device of claim 9, further comprising a driving roller, wherein at least one of the pressing members comprises a driven roller, and the driven roller and driving roller form a pair of conveying rollers which nip the photosensitive material therebetween and convey the photosensitive material.

15. The image recording device of claim 14, wherein respective rollers of the pair of conveying rollers are disposed so as to be relatively movable between contact positions where the respective rollers of the pair of conveying rollers contact one another with pressure, and separated positions where the respective rollers of the pair of conveying rollers are separated from one another.

16. The image recording device of claim 15, wherein, when a portion of the photosensitive material is positioned at the exposure position, the respective rollers of the pair of conveying rollers move relatively toward the contact positions so as to begin to contact the photosensitive material in a state in which the photosensitive material is positioned between the respective rollers of the pair of conveying rollers.

17. The image recording device of claim 16, further comprising a sensor for detecting a position of the photosensitive material, wherein relative movement of the respective rollers of the pair of conveying rollers is carried out on the basis of a detection operation of the sensor.

18. The image recording device of claim 14, further comprising another pair of conveying rollers which nip the photosensitive material therebetween and convey the photosensitive material, wherein conveying force of a pair of conveying rollers nearer to the exposure position is greater than conveying force of a pair of conveying rollers further from the exposure position.

* * * * *